United States Patent
Lu et al.

(10) Patent No.: US 11,315,355 B2
(45) Date of Patent: Apr. 26, 2022

(54) ELECTRIC LOCK AND CONTROL METHOD THEREOF

(71) Applicant: Taiwan Fu Hsing Industrial Co., Ltd., Kaohsiung (TW)

(72) Inventors: Shih-Min Lu, Kaohsiung (TW); I-Chang Shih, Tainan (TW); Pi-Shun Chang, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 0 days.

(21) Appl. No.: 17/019,530

(22) Filed: Sep. 14, 2020

(65) Prior Publication Data
US 2021/0295009 A1   Sep. 23, 2021

(30) Foreign Application Priority Data
Mar. 17, 2020   (TW) ................. 10910883.1

(51) Int. Cl.
*G06K 9/00*    (2006.01)
*G06V 40/13*   (2022.01)

(52) U.S. Cl.
CPC .................. *G06V 40/13* (2022.01)

(58) Field of Classification Search
None
See application file for complete search history.

(56) References Cited

U.S. PATENT DOCUMENTS

| | | | |
|---|---|---|---|
| 7,423,515 B1* | 9/2008 | Fiske | E05B 47/0002 340/5.2 |
| 10,169,940 B1* | 1/2019 | Lu | G06F 21/44 |
| 2006/0274920 A1* | 12/2006 | Tochikubo | G07C 9/00563 382/124 |

(Continued)

FOREIGN PATENT DOCUMENTS

| CN | 102446271 B | 8/2014 |
|---|---|---|
| CN | 108266061 A | 7/2018 |

(Continued)

OTHER PUBLICATIONS

Website, http://www.cool3c.coj/atricle/84035 (Aug. 28, 2014), 16 pages, and partial English translation of p. 3, 1 page.

*Primary Examiner* — Nicholas J Lee
(74) *Attorney, Agent, or Firm* — Karin L. Williams; Alan D. Kamrath; Mayer & Williams PC

(57) ABSTRACT

An electric lock includes a fingerprint module and a control circuit. The fingerprint module includes a fingerprint sensing unit configured to sense a fingerprint image of a user, and a fingerprint recognition unit electrically connected to the fingerprint sensing unit and configured to compare the fingerprint image of the user with registered fingerprint data pre-stored in the fingerprint recognition unit to generate a comparison result. The control circuit is electrically connected to the fingerprint recognition unit, and configured to control the electric lock to perform a predetermined operation according to the comparison result. The fingerprint sensing unit and the fingerprint recognition unit are inte- (Continued)

grated and packaged in a same chip, and the comparison result is transmitted from the fingerprint recognition unit to the control circuit after being encrypted according to a predetermined encryption method.

18 Claims, 6 Drawing Sheets

(56) References Cited

U.S. PATENT DOCUMENTS

| | | | | |
|---|---|---|---|---|
| 2013/0206542 | A1* | 8/2013 | Menoud | G07F 9/10 194/350 |
| 2016/0335820 | A1* | 11/2016 | Wang | G07C 9/00563 |
| 2017/0116455 | A1* | 4/2017 | Alameh | G06F 1/3262 |

FOREIGN PATENT DOCUMENTS

| | | |
|---|---|---|
| TW | 200732544 A | 9/2007 |
| TW | M497691 U | 3/2015 |

* cited by examiner

ELECTRIC LOCK AND CONTROL METHOD THEREOF

BACKGROUND OF THE INVENTION

1. Field of the Invention

The present invention relates to an electric lock, and more particularly, to a high security electric lock with fingerprint recognition function.

2. Description of the Prior Art

Generally, an electric lock with fingerprint recognition function comprises a fingerprint receiving module, a fingerprint storage module, and a fingerprint recognition module. The fingerprint receiving module is configured to receive a fingerprint image input by a user. The fingerprint storage module is configured to store at least one registered fingerprint image. The fingerprint recognition module is configured to compare the input fingerprint image with the registered fingerprint image. If the fingerprint recognition module determines that the input fingerprint image matches the registered fingerprint image, the fingerprint recognition module outputs a control signal to the electric lock in order to control the electric lock to perform an unlocking operation. However, the fingerprint receiving module, the fingerprint storage module and the fingerprint recognition module of the electric lock of the prior art are individual components independent from each other. When a housing of the electric lock is opened or destroyed, the fingerprint storage module can be directly connected to an external electronic device, so that the registered fingerprint image stored in the fingerprint storage module can be easily read and copied by the external electronic device.

SUMMARY OF THE INVENTION

The present invention relates to an electric lock and a control method thereof.

The electronic lock of the present invention comprises a fingerprint module and a control circuit. The fingerprint module comprises a fingerprint sensing unit configured to sense a fingerprint image of a user, and a fingerprint recognition unit electrically connected to the fingerprint sensing unit and configured to compare the fingerprint image of the user with registered fingerprint data pre-stored in the fingerprint recognition unit to generate a comparison result. The control circuit is electrically connected to the fingerprint recognition unit and configured to control the electric lock to perform a predetermined operation according to the comparison result. The fingerprint sensing unit and the fingerprint recognition unit are integrated and packaged in a same chip, and the comparison result is transmitted from the fingerprint recognition unit to the control circuit after being encrypted according to a predetermined encryption method.

The control method of the electric lock of the present invention comprises providing an electric lock comprising a fingerprint module and a control circuit, wherein the fingerprint module comprises a fingerprint sensing unit and a fingerprint recognition unit integrated and packaged in a same chip; the fingerprint sensing unit sensing a fingerprint image of a user; the fingerprint recognition unit comparing the fingerprint image of the user with registered fingerprint data pre-stored in the fingerprint recognition unit to generate a comparison result; the fingerprint recognition unit encrypting the comparison result according to a predetermined encryption method, and transmitting the encrypted comparison result to the control circuit; and the control circuit decrypting the encrypted comparison result according to the predetermined encryption method, and controlling the electric lock to perform a predetermined operation according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
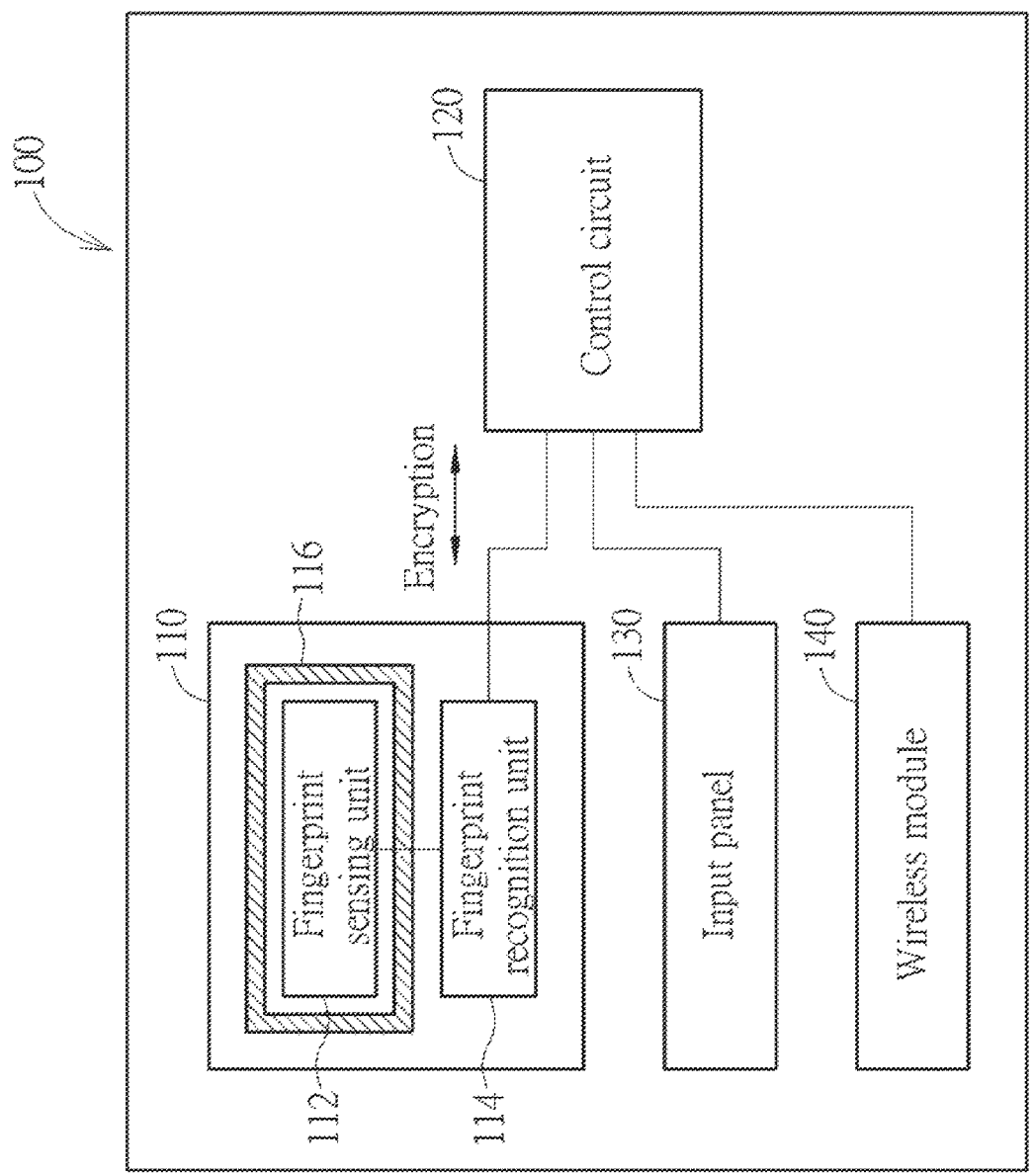
FIG. 1 is a functional block diagram of an electric lock of the present invention.

Please refer to FIG. 1. FIG. 1 is a functional block diagram of an electric lock of the present invention. As shown in FIG. 1, the electric lock 100 of the present invention includes a fingerprint module 110, a control circuit 120 and an input panel 130. The fingerprint module 110 is configured to perform a fingerprint recognition function. The control circuit 120 is configured to control operations of the electric lock 100, such as controlling the electric lock 100 to perform an unlocking operation, a locking operation or a fingerprint registration operation. The input panel 130 is configured to receive key input or touch input, but the present invention is not limited thereto. In addition, the electric lock 100 of the present invention can further comprises a wireless module 140 configured to communicate with an electronic device outside the electric lock 100. For example, the wireless module 140 can communicate with a mobile device near the electric lock 100 by using short-range wireless communication technology; or the wireless module 140 can communicate with a remote electronic device via a wireless network.

The fingerprint module 110 comprises a fingerprint sensing unit 112 and a fingerprint recognition unit 114 electrically connected to the fingerprint sensing unit 112. The fingerprint sensing unit 112 is configured to sense a fingerprint image of a user. The fingerprint recognition unit 114 is configured to compare the fingerprint image of the user with registered fingerprint data pre-stored in the fingerprint recognition unit 114 to generate a comparison result. In the present invention, the fingerprint sensing unit 112 and the fingerprint recognition unit 114 are integrated and packaged in a same chip, and the fingerprint recognition unit 114 sends out only the comparison result. On the other hand, the fingerprint module 110 can enter a sleep mode to save power when the fingerprint module 110 is not in operation. The fingerprint module 110 can further comprise a metal wake-up coil 116 surrounding the fingerprint sensing unit 112. The metal wake-up coil 116 is configured to sense a finger of the user to wake up the fingerprint module 110.

Figure 2:
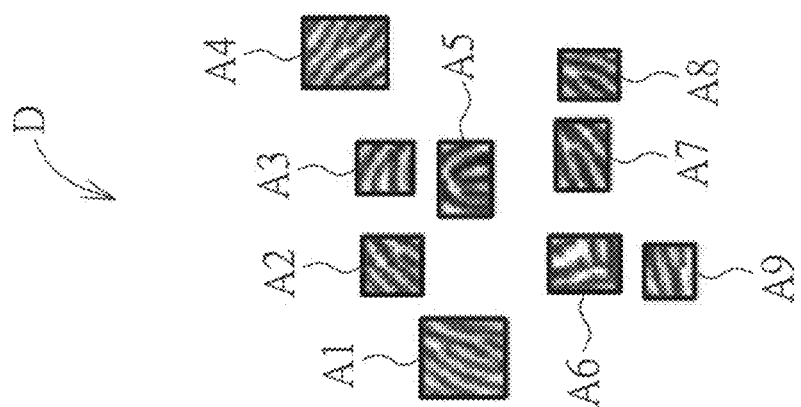
FIG. 2 is a diagram showing the electric lock of the present invention obtaining registered fingerprint data from an input fingerprint image.
Figure 2:
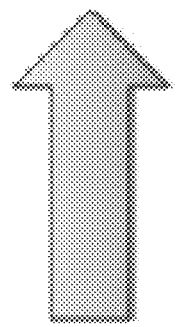
Figure 2:
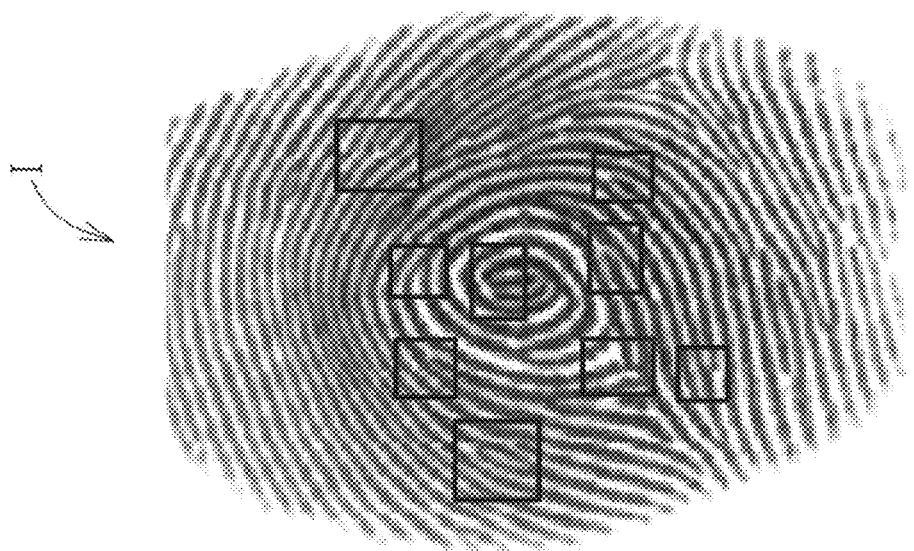

Please refer to FIG. 2, and refer to FIG. 1 as well. FIG. 2 is a diagram showing the electric lock of the present invention obtaining the registered fingerprint data from an input fingerprint image. As shown in figures, when the control circuit 120 controls the electric lock 100 to perform the fingerprint registration operation, the user can use the fingerprint sensing unit 112 to input at least one fingerprint image (the user can input a plurality of fingerprint images to increase recognition reliability). When the fingerprint sensing unit 112 transmits the input fingerprint image I to the fingerprint recognition unit 114, the fingerprint recognition unit 114 first recognizes a plurality of feature points on the input fingerprint image I, such as feature points A1 to A9. Thereafter, the fingerprint recognition unit 114 retains images and relative positions of the plurality of feature points A1 to A9, and deletes images of areas other than the plurality of feature points A1 to A9 to obtain registered fingerprint data D. The registered fingerprint data D is further stored in a memory in the fingerprint recognition unit 114. In FIG. 2, the number of feature points is only for illustration, and the present invention is not limited thereto. In addition, recognition methods of the feature points (such as a start point, an end point, a junction point and a bifurcation point) include, but are not limited to, current fingerprint recognition methods.

Figure 3:
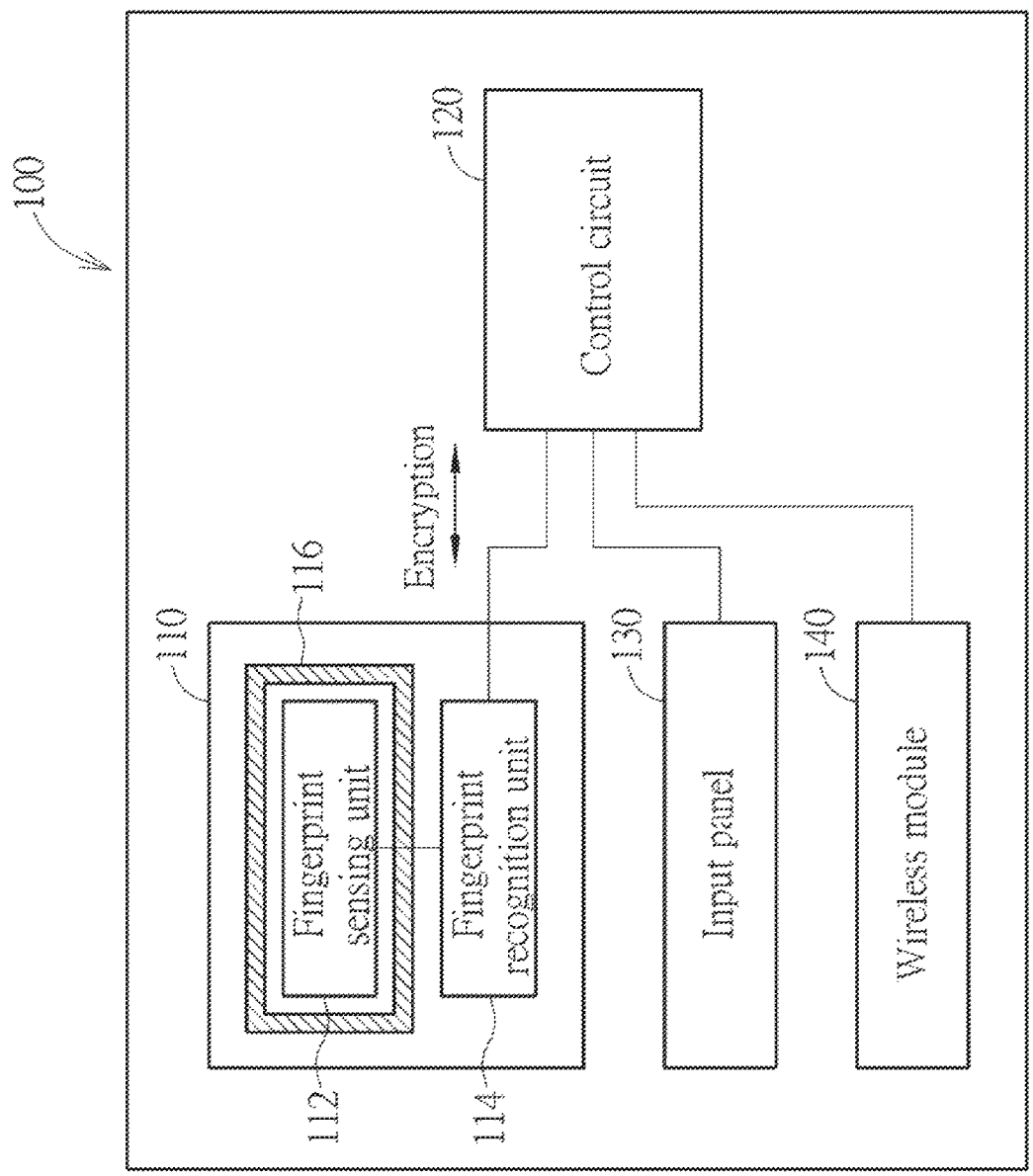
FIG. 3 is a diagram showing the electric lock of the present invention performing a fingerprint recognition function.
Figure 4:
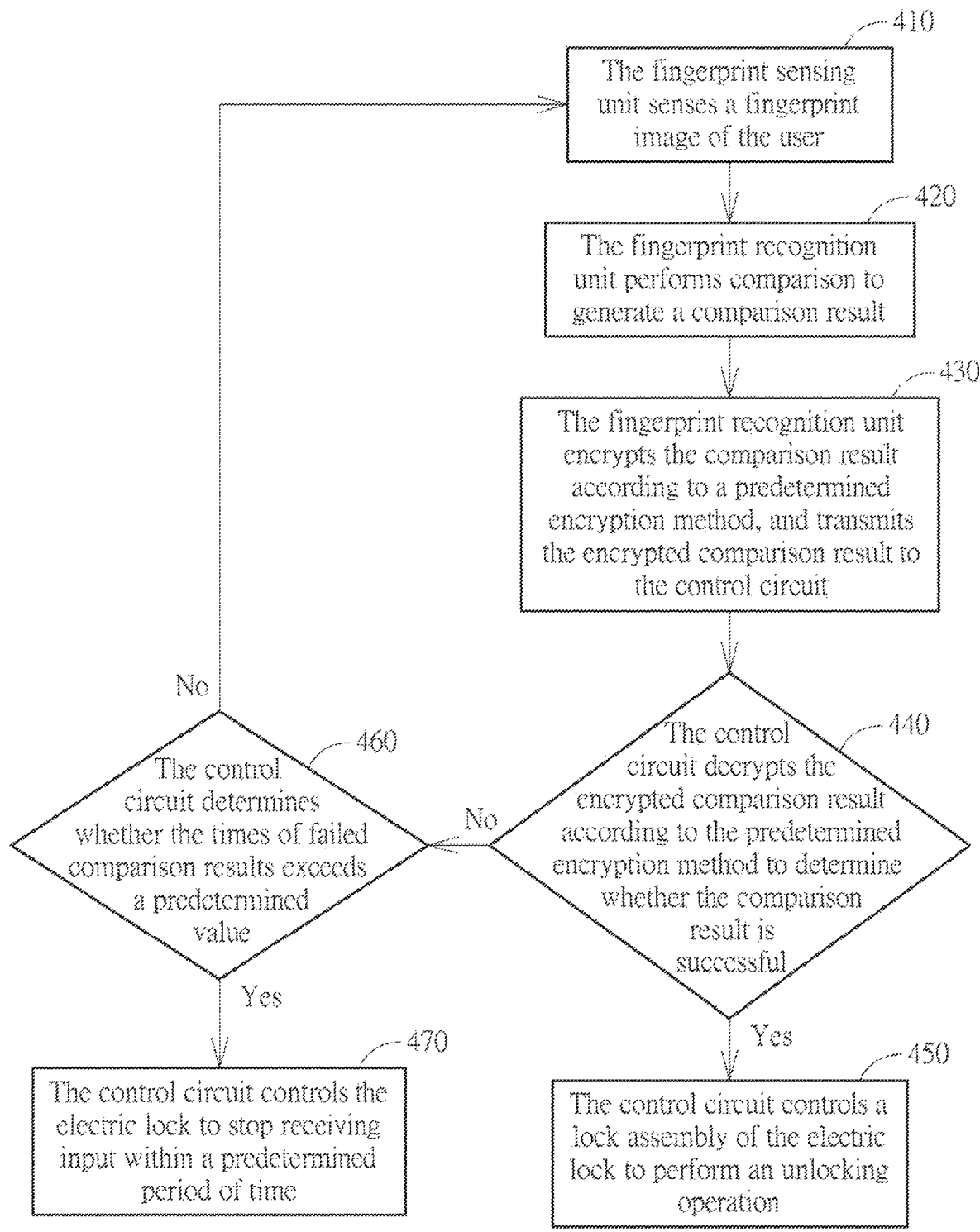
FIG. 4 is a flowchart of the electric lock of the present invention performing the fingerprint recognition function.

Please refer to FIG. 3 and FIG. 4. FIG. 3 is a diagram showing the electric lock of the present invention performing the fingerprint recognition function. FIG. 4 is a flowchart of the electric lock of the present invention performing the fingerprint recognition function. As shown in figures, when the electric lock 100 of the present invention performs the fingerprint recognition function, the user can touch the fingerprint sensing unit 112 by a finger F to allow the fingerprint sensing unit 112 to sense a fingerprint image of the user (Step 410). After the fingerprint sensing unit 112 senses the fingerprint image of the user, the fingerprint recognition unit 114 compares the fingerprint image of the user with the registered fingerprint data D pre-stored in the fingerprint recognition unit 114 to generate a comparison result (Step 420). The fingerprint recognition unit 114 recognizes a plurality of feature points on the fingerprint image of the finger F, and further compares the feature points of the finger F with the images and relative positions of the feature points in the registered fingerprint data D. When the plurality of feature points on the fingerprint image of the finger F match the images and the relative positions of the feature points in the registered fingerprint data D (or a match percentage is higher than a predetermined threshold), the fingerprint recognition unit 114 determines that the comparison succeeds, and generates a successful comparison result. When the plurality of feature points on the fingerprint image of the finger F do not match the images and the relative positions of the feature points in the registered fingerprint data D (or the match percentage is lower than the predetermined threshold), the fingerprint recognition unit 114 determines that the comparison fails, and generates a failed comparison result. Thereafter, the fingerprint recognition unit 114 encrypts the comparison result according to a predetermined encryption method, and transmits the encrypted comparison result to the control circuit 120 (Step 430). The predetermined encryption method can be an encryption method such as MD5, AES, DES, 3DES, IDEA, BASE64, RSA, DSA, ECC, SHA, HMAC, SSL, TLS, BLOWFISH, RC5, RC6, Caesar cipher, Affine Cipher, etc. But the present invention is not limited thereto. After the control circuit 120 receives the encrypted comparison result, the control circuit decrypts the encrypted comparison result according to the same predetermined encryption method to determine whether the comparison result is successful (Step 440). When the control circuit 120 determines that the comparison result is successful, the control circuit 120 controls a lock assembly of the electric lock 100 to perform an unlocking operation (Step 450). On the other hand, when the control circuit 120 determines that the comparison result is failed, the control circuit 120 further determines whether the times of failed comparison results exceeds a predetermined value (Step 460). When the control circuit 120 determines that the times of failed comparison results does not exceed the predetermined value, the control circuit 120 allows the user to input the fingerprint again (that is, returning to Step 410). When the control circuit 120 determines that the number of failed comparison results exceeds the predetermined value, the control circuit 120 controls the electric lock 100 to stop receiving input within a predetermined period of time (Step 470), such as controlling the fingerprint module 110 and the input panel 130 to stop receiving input within a predetermined period of time.

According to the above arrangement, since the fingerprint sensing unit 112 and the fingerprint recognition unit 114 are integrated and packaged in the same chip, and the fingerprint recognition unit 114 sends out only the comparison result, the memory in the fingerprint recognition unit 114 for storing the registered fingerprint data D is not exposed and cannot be read by external electronic devices, thereby reducing risk of the registered fingerprint data D being stolen. In addition, the registered fingerprint data D only comprises the images and the relative positions of the feature points, and does not comprise the images of areas other than the feature points. Therefore, even if the registered fingerprint data D is stolen, the registered fingerprint data D cannot be restored to a complete fingerprint image. Furthermore, the fingerprint recognition unit 114 and the control circuit 120 are configured to communicate with each other by using the predetermined encryption method, so as to reduce risk of the electric lock 100 being hacked and cracked.

On the other hand, the registered fingerprint data D can be further encrypted to be stored in the memory of the fingerprint recognition unit 114 to further increase security of the registered fingerprint data D. A method for encrypting the registered fingerprint data D can be identical to or different from the predetermined encryption method. Since the data size of the registered fingerprint data D is smaller than the data size of the complete fingerprint image, the memory of the fingerprint recognition unit 114 can store more registered fingerprint data D, and the fingerprint recognition unit 114 can have a faster comparison speed.

Figure 5:
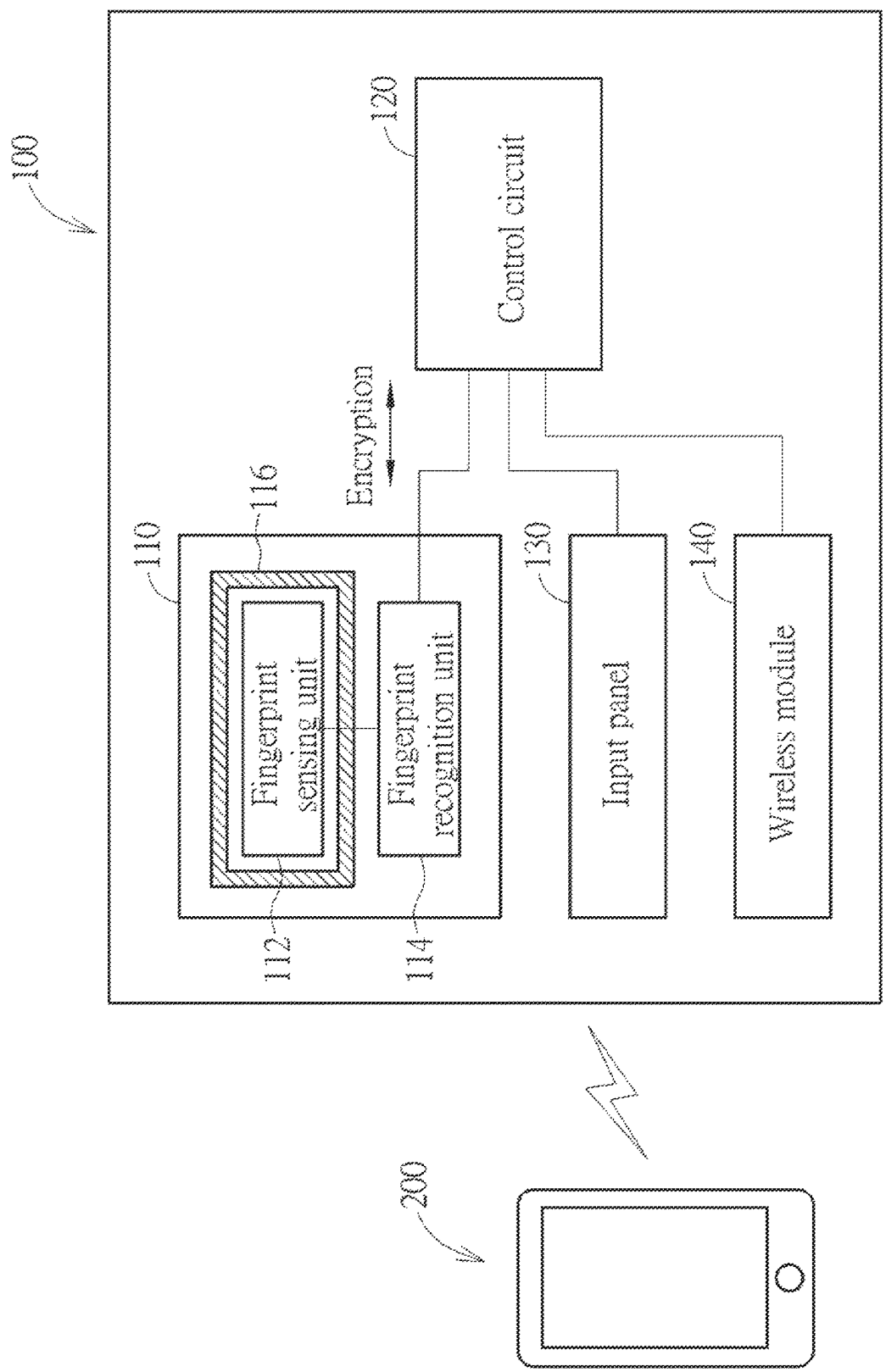
FIG. 5 is a diagram showing the electric lock of the present invention performing a remote control fingerprint recognition function.
Figure 6:
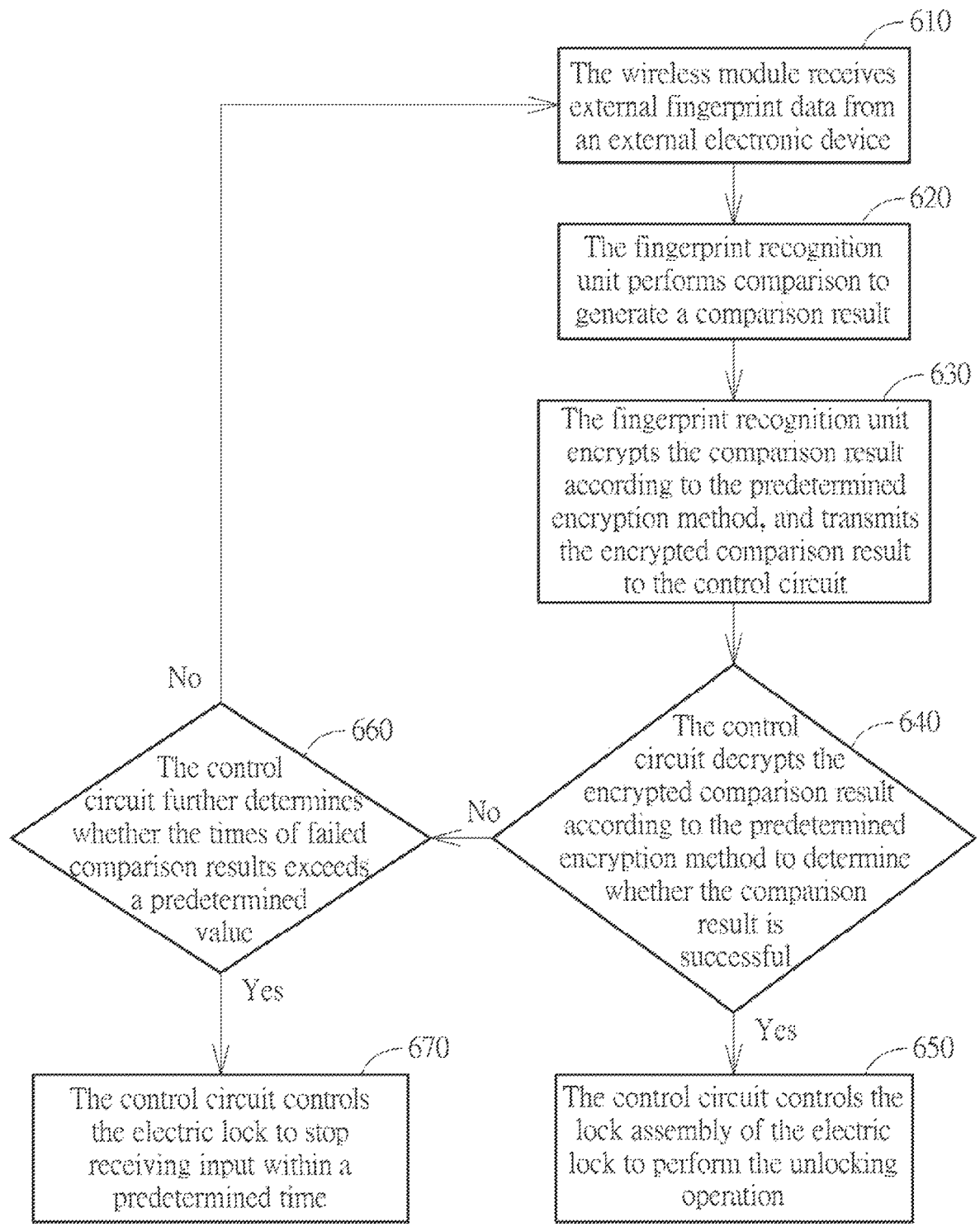
FIG. 6 is a flowchart of the electric lock of the present invention performing the remote control fingerprint recognition function.

Please refer to FIG. 5 and FIG. 6. FIG. 5 is a diagram showing the electric lock of the present invention performing a remote control fingerprint recognition function. FIG. 6 is a flowchart of the electric lock of the present invention performing the remote control fingerprint recognition function. As shown in figures, when the electric lock 100 of the present invention performs the remote control fingerprint recognition function, the wireless module 140 is configured to receive external fingerprint data from an external electronic device 200 (Step 610). For example, the user can use a mobile device to transmit the fingerprint data (the external fingerprint data) of the user to the wireless module 140 through the short-range wireless communication technology; alternatively, the user can use a remote electronic device to transmit the fingerprint data of the user to the wireless module 140 via the wireless network. The fingerprint data of the user can be a complete fingerprint image or fingerprint data comprising only feature points and relative positions. When the external electronic device 200 senses the fingerprint image of the user, an application program installed in the external electronic device 200 can retain the images and the relative positions of the plurality of feature points from the fingerprint image, and delete the images of the areas other than the plurality of feature points to obtain the external fingerprint data. The external electronic device 200 can also communicate with the electric lock 100 by using the application program. After the external fingerprint data is transmitted from the external electronic device 200 to the fingerprint recognition unit 114 through the wireless module 140 and the control circuit 120, the fingerprint recognition unit 114 compares the external fingerprint data with the registered fingerprint data D pre-stored in the fingerprint recognition unit 114 to generate a comparison result (Step 620). When the plurality of feature points of the external fingerprint data match the images and relative positions of the feature points in the registered fingerprint data D (or a match percentage is higher than the predetermined threshold value), the fingerprint recognition unit 114 determines that the comparison succeeds and generates a successful comparison result. When the plurality of feature points of the external fingerprint data do not match the images and relative positions of the feature points in the registered fingerprint data D (or the match percentage is lower than the predetermined threshold value), the fingerprint recognition unit 114 determines that the comparison fails, and generates a failed comparison result. Thereafter, the fingerprint recognition unit 114 encrypts the comparison result according to the aforementioned predetermined encryption method, and transmits the encrypted comparison result to the control circuit 120 (Step 630). After the control circuit 120 receives the encrypted comparison result, the control circuit decrypts the encrypted comparison result according to the same predetermined encryption method to determine whether the comparison result is successful (Step 640). When the control circuit 120 determines that the comparison result is successful, the control circuit 120 controls the lock assembly of the electric lock 100 to perform the unlocking operation (Step 650). On the other hand, when the control circuit 120 determines that the comparison result is failed, the control circuit 120 further determines whether the times of failed comparison results exceeds a predetermined value (Step 660). When the control circuit 120 determines that the times of failed comparison results does not exceed the predetermined value, the control circuit 120 allows the user to retransmit the external fingerprint data (that is, returning to Step 610). When the control circuit 120 determines that the times of failed comparison results exceeds the predetermined value, the control circuit 120 controls the electric lock 100 to stop receiving input within a predetermined time (Step 670), such as controlling the fingerprint module 110, the input panel 130, and the wireless module 140 to stop receiving input within a predetermined period of time.

According to the above arrangement, the user can use the external electronic device 200 to perform fingerprint recognition in the electric lock 100. In addition, when the external fingerprint data is transmitted from the external electronic device 200 to the fingerprint recognition unit 114 through the wireless module 140 and the control circuit 120, the external fingerprint data can also be encrypted by the application program of the external electronic device 200 according to the aforementioned predetermined encryption method, so as to reduce risk of the external fingerprint data being stolen. Furthermore, when the external fingerprint data comprises only the images and the relative positions of the feature points, a complete fingerprint image cannot be restored even if the external fingerprint data is stolen.

On the other hand, in Step 450 and Step 650, when the control circuit 120 determines that the comparison result is successful, the control circuit 120 is not limited to controlling the lock assembly of the electric lock 100 to perform the unlocking operation. The control circuit 120 can also control the electric lock 100 to perform other operations, such as changing or adding registered fingerprint data, or changing or adding a key password of the input panel 130.

In contrast to the prior art, the memory, which is used for storing the registered fingerprint data, of the electric lock of the present invention is not exposed and cannot be read by external electronic devices, thereby reducing the risk of the registered fingerprint data being stolen. In addition, the registered fingerprint data comprises only the images and the relative positions of the feature points, such that the complete fingerprint image cannot be restored, thereby increasing security of the registered fingerprint data. Furthermore, the fingerprint recognition unit and the control circuit communicate with each other by using the predetermined encryption method, so that the risk of the electric lock being hacked and cracked can be reduced. On the other hand, since the data size of registered fingerprint data is smaller than the data size of the complete fingerprint image, the electric lock of the present invention can store more registered fingerprint data and has a faster comparison speed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric lock, comprising:
   a fingerprint module, comprising:
      a fingerprint sensing unit configured to sense a fingerprint image of a user; and
      a fingerprint recognition unit electrically connected to the fingerprint sensing unit and configured to compare the fingerprint image of the user with registered fingerprint data pre-stored in the fingerprint recognition unit to generate a comparison result; and
   a control circuit electrically connected to the fingerprint recognition unit and configured to control the electric lock to perform a predetermined operation according to the comparison result;
   wherein the fingerprint sensing unit and the fingerprint recognition unit are integrated and packaged in a same chip, and are configured so that the comparison result is transmitted from the fingerprint recognition unit to the control circuit after being encrypted according to a predetermined encryption method regardless of whether the comparison result is successful or failed.

2. The electric lock of claim 1, wherein the pre-stored registered fingerprint data is obtained by retaining images and relative positions of a plurality of feature points from at least one input fingerprint image.

3. The electric lock of claim 1, wherein the control circuit is configured to control a lock assembly of the electric lock to perform an unlocking operation according to the comparison result.

4. The electric lock of claim 1, wherein the control circuit is configured to control the electric lock to stop receiving input within a predetermined period of time when the control circuit determines that times of failed comparison results exceeds a predetermined value.

5. The electric lock of claim 1, further comprising a wireless module configured to receive external fingerprint data transmitted from an external electronic device; wherein the fingerprint recognition unit is further configured to compare the external fingerprint data with the registered fingerprint data pre-stored in the fingerprint recognition unit to generate an external comparison result, and the control circuit is further configured to control the electric lock to perform a predetermined remote control operation according to the external comparison result.

6. The electric lock of claim 5, wherein the external fingerprint data is obtained by the external electronic device using an application program to retain images and relative positions of a plurality of feature points from a fingerprint image.

7. The electric lock of claim 5, wherein the external fingerprint data is obtained by the external electronic device using an application program to encrypt a fingerprint image.

8. The electric lock of claim 1, wherein the fingerprint module further comprises a metal wake-up coil surrounding the fingerprint sensing unit, and the metal wake-up coil is configured to sense a finger of the user to wake up the fingerprint module.

9. A control method of an electric lock, comprising:
   providing an electric lock comprising a fingerprint module and a control circuit, wherein the fingerprint module comprises a fingerprint sensing unit and a fingerprint recognition unit integrated and packaged in a same chip;
   the fingerprint sensing unit sensing a fingerprint image of a user;
   the fingerprint recognition unit comparing the fingerprint image of the user with registered fingerprint data pre-stored in the fingerprint recognition unit to generate a comparison result;
   the fingerprint recognition unit encrypting the comparison result according to a predetermined encryption method, and transmitting the encrypted comparison result to the control circuit regardless of whether the comparison result is successful or failed; and
   the control circuit decrypting the encrypted comparison result according to the predetermined encryption method, and controlling the electric lock to perform a predetermined operation according to the comparison result.

10. The control method of the electric lock of claim 9, further comprising obtaining the pre-stored registered fingerprint data by retaining images and relative positions of a plurality of feature points from at least one input fingerprint image.

11. The control method of the electric lock of claim 9, wherein the control circuit is configured to control the electric lock to perform an unlocking operation according to the comparison result.

12. The control method of the electric lock of claim 9, wherein the control circuit is configured to control the electric lock to stop receiving input within a predetermined period of time when the control circuit determines that times of failed comparison results exceeds a predetermined value.

13. The control method of the electric lock of claim 9, wherein the electric lock further comprises a wireless module, and the control method further comprises:
   the wireless module receiving external fingerprint data transmitted from an external electronic device;
   the fingerprint recognition unit comparing the external fingerprint data with the registered fingerprint data pre-stored in the fingerprint recognition unit to generate an external comparison result;
   the fingerprint recognition unit encrypting the external comparison result according to the predetermined encryption method, and transmitting the encrypted external comparison result to the control circuit; and
   the control circuit decrypting the encrypted external comparison result according to the predetermined encryption method, and controlling the electric lock to perform a predetermined remote control operation according to the external comparison result.

14. The control method of the electric lock of claim 13, further comprising the external electronic device obtaining the external fingerprint data by using an application program to retain images and relative positions of a plurality of feature points from a fingerprint image.

15. The control method of the electric lock of claim 13, further comprising the external electronic device obtaining the external fingerprint data by using an application program to encrypt a fingerprint image.

16. The control method of the electric lock of claim 9, wherein the fingerprint module further comprises a metal wake-up coil surrounding the fingerprint sensing unit, and the control method further comprises the metal wake-up coil sensing a finger of the user to wake up the fingerprint module.

17. The electric lock of claim 1, wherein the fingerprint recognition unit comprises a memory for storing the registered fingerprint data, and the memory is not exposed and cannot be read by an external electronic device.

18. The control method of the electric lock of claim 9, wherein the fingerprint recognition unit comprises a memory for storing the registered fingerprint data, and the memory is not exposed and cannot be read by an external electronic device.

* * * * *